May 29, 1934.  A. B. DU MONT  1,960,333
CATHODE RAY INSTRUMENT FOR MEASURING ELECTRICAL QUANTITIES
Filed Oct. 7, 1932  2 Sheets-Sheet 1
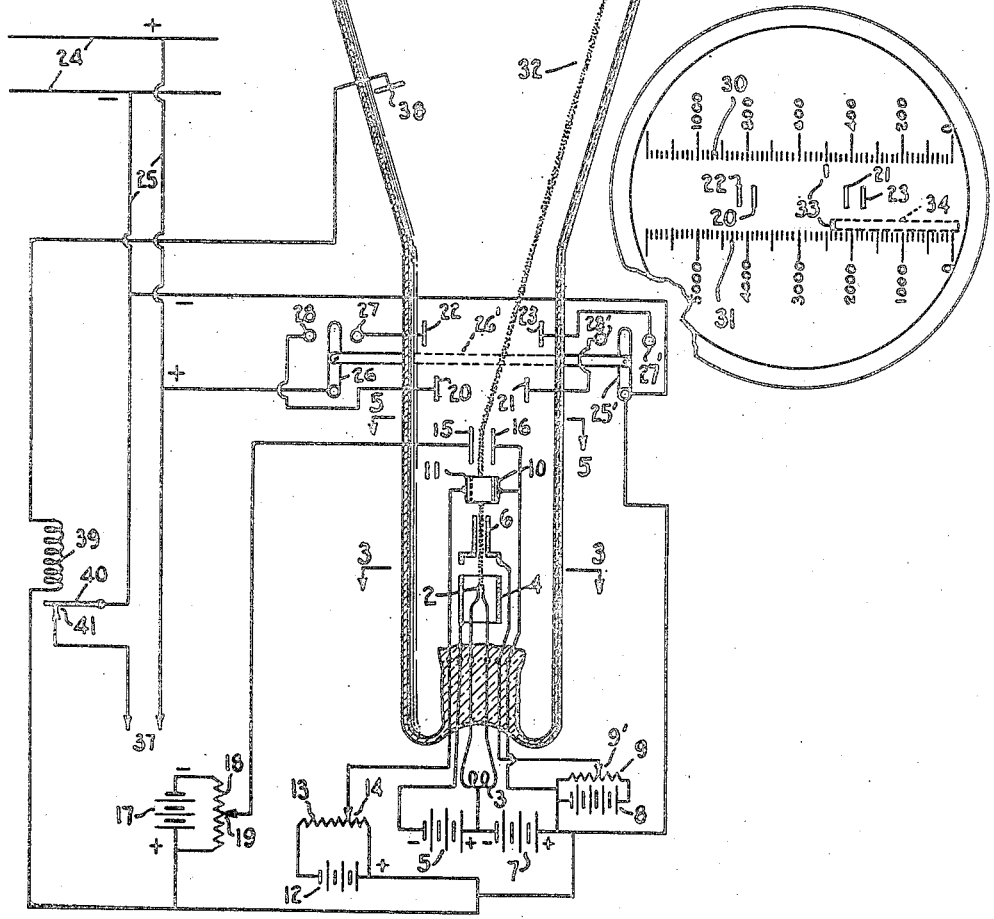
Allen B. DuMont INVENTOR
BY Thomas Howe ATTORNEY May 29, 1934. A. B. DU MONT 1,960,333
CATHODE RAY INSTRUMENT FOR MEASURING ELECTRICAL QUANTITIES
Filed Oct. 7, 1932 2 Sheets-Sheet 2

Allen B. Du Mont INVENTOR
BY
Thomas Howe ATTORNEY

Patented May 29, 1934

1,960,333

UNITED STATES PATENT OFFICE 1,960,333

CATHODE RAY INSTRUMENT FOR MEASURING ELECTRICAL QUANTITIES

Allen B. Du Mont, Upper Montclair, N. J.

Application October 7, 1932, Serial No. 636,719

7 Claims. (Cl. 171—95)

This invention relates to means for measuring electrical values which employs the shifting of a cathode ray or beams in accordance with the value to be measured.

It is an object of the present invention to provide a measuring instrument for electrical values which requires no, or a minimum of, current to operate.

It is a further object of the invention to provide an electrical measuring instrument which shall be extremely flexible as to range.

It is a further object of the invention to provide an improved electrical measuring instrument which shall accurately and instantaneously indicate the desired measurements of electrical values.

It is a further object of the invention to provide an instrument wherein small values or variations in value may be readily noted.

It is a further object of the invention to provide an instrument for measuring electrical values which can be used for direct current or for alternating current of any frequency.

At the present time voltmeters, variable for use between voltages of approximately 1000 to 10,000 volts are expensive and often consume enough current to be objectionable.

It is a further object of this invention to provide a voltmeter employing cathode rays which requires none or a minimum of current to operate.

It is a further object of the invention to provide a means involving the deflection of cathode rays for automatically breaking a circuit when the electrical values exceed a predetermined value.

Other and ancillary objects of the invention will appear hereinafter.

In the accompanying drawings which illustrate the invention—

Fig. 1 is a diagrammatic view showing a cathode ray tube in axial section and appurtenant apparatus and connections embodying the invention;

Fig. 2 is a top plan view of the tube of Fig. 1;

Fig. 6 is a view similar to Fig. 1 but showing the apparatus adapted for use as an ammeter, that is for measuring electric current, many of the parts being broken away but sufficient being shown to illustrate the adaptation referred to.

Figure 3:
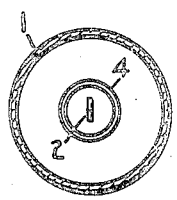
Fig. 3 is a section on the line 3—3 of Fig. 1.

Referring to the drawings, the apparatus comprises a glass envelope or bulb 1 which is exhausted to a vacuum in the order of a millionth of an atmosphere.

Suitably mounted within the envelope is an electron-emitting filament 2 heated by current from the secondary 3 of a transformer having its primary connected with a suitable alternating electrical source. Surrounding the filament 2 is a tubular metal focussing electrode 4 maintained at a negative potential with relation to the filament 2 by means of a battery 5, the plus terminal of which is connected with the central point of the transformer secondary 3, and the negative terminal of which is connected with the electrode 4. Also mounted within the envelope and in alignment with the electrode 4, is the metal tubular accelerating electrode 6 which is maintained at a positive potential with relation to the filament by means of a battery 7, and a battery 8, the minus terminal being connected with the central point of the transformer secondary 3, and the plus terminal with the electrode 6. About the battery 8 is a potentiometer resistance 9 along which the contact 9' connected with the electrode 6, may be moved whereby the potential of the accelerating electrode 6 may be varied. The battery 8 is a conventional illustration of any suitable character and value of direct current source.

Upon opposite sides of the path of the cathode rays are the deflecting plates 10 and 11 adapted to shift the luminous indicating spot from one scale to another as will be hereinafter referred to, the plate 10 being connected with the plus terminal of the battery 12 across which is connected the potentiometer resistance 13 engaged by the movable contact 14 which is connected with the deflecting plate 11, the potential difference between the plates 10 and 11 being varied by moving the contact 14 along the resistance 13.

Above the plates 10 and 11 is another pair of deflecting plates 15 and 16 on opposite sides of the cathode ray path and displaced substantially 90° about that path from the deflecting plates 10 and 11. The plate 16 is connected with the plus terminal of the battery 17 across which is connected the potentiometer resistance 18 engaged by the movable contact 19 which is connected with the other plate 15. By moving the contact 19 along the resistance 18 the potential difference between the plates 15 and 16 may be varied.

Above the deflecting plates 15 and 16 are the deflection plates 20 and 21 on opposite sides of the cathode ray path and in substantially the same angular position in relation thereto as the plates 15 and 16, and above the plates 20 and 21 is another pair of deflection plates 22 and 23 on opposite sides of the cathode ray path and somewhat further removed from the axis of the tube than the plates 20 and 21. The plates 22 and 23 occupy substantially the same angular position with relation to the tube axis as do the deflection plates 20 and 21.

The conductors 24 are connected with a suitable source of voltage and from these conductors lead branch conductors 25 which lead to a device to which which it is desired to supply the voltage. It being assumed that the voltage source is direct current, the minus conductor of the pair 25 is connected with the pivoted conductor arm 25' adapted to alternately connect with the contacts 27' and 28' which are respectively connected with the deflecting plates 21 and 23, while the plus conductor is connected with the pivoted switch arm 26 adapted to alternately engage with the contact 27 connected with the deflecting plate 22 and the contact 28 connected with the deflecting plate 20. The switch arms 26 and 25' are mechanically secured together by an insulating bar 26' pivoted at its ends to the arms whereby the arms are moved together and simultaneously engage the contacts 28 and 28' on the one hand or contacts 27 and 27' on the other.

To the inside of the end of the envelope or tube 1 is secured a strip 29 of material such as calcium tungstate which will fluoresce under the action of the cathode beam or ray. Upon the outside of the glass and over the fluorescent strip 29 are etched upon the glass the two scales 30 and 31 extending substantially parallel to the plane of deflection of the cathode beam by the plates 20—21 and 22—23 respectively, and calibrated to read in volts and adapted to accommodate high and low voltages respectively. Instead of etching these scales upon the glass they may be upon transparent paper which may be secured on the outside of the glass over the fluorescent strip or be produced in other ways.

The operation of the apparatus may now be referred to as follows:

The electron stream 32 proceeding from the filament 2 and through an accelerating electrode would, if undeflected, tend to proceed in a direction in line with the electrode 6 which would intersect the fluorescent screen, and cause a luminous spot, slightly to one side of the center of the tube or bulb end and adjacent the scale 31. It being, however, assumed that a voltage less than 1200 is to be measured, it is desired that the luminous spot shall be adjacent the scale 30 and accordingly the potentiometer contact 14 is so adjusted that the cathode ray is shifted so that the spot is adjacent the scale 30. Also the potentiometer contact 19 is so adjusted that the luminous spot is shifted to a point opposite the zero of that scale. The adjustments having been made as described, the arms 26 and 25' are placed in contact with the contacts 28 and 28' thereby connecting the conductors 25 with the plates 20 and 21 respectively when the luminous spot 33 will move to a position opposite a point in the scale 30 corresponding to the voltage to be measured, i. e., across the conductors 25, in the illustration the spot being opposite the scale point denoting 500 volts.

If the voltage to be measured is of a higher order than that adapted to the scale 30, for instance if it is between 1000 and 6000 volts, the switch arms 26 and 25' are thrown into engagement with the contacts 27 and 27' thereby impressing the voltage to be measured across the plates 22 and 23 which are further removed from the path of the cathode ray and so exercise less deflecting force on it in proportion to the voltage. Also the potential across the plates 10 and 11 is removed so that the point of intersection of the cathode beam with the fluorescent material (and therefore the luminous spot) moves into a position adjacent to the scale 31 and this spot is deflected along the scale according to the voltage impressed upon the plates 22 and 23. In the drawings the spot 33 is indicated for a value of 2400 volts and is opposite the division of the scale 31 corresponding to such a number.

The deflection plates 15 and 16 for deflecting the ray and its luminous spot to one side of the tube end as described, might be omitted if the electrode 6 and its appurtenant apparatus were pointed so that the cathode ray, without deflection, would intersect the fluorescent strip at one side as described.

If the voltage to be measured is an alternating current voltage, the shifting of the luminous spot will be too rapid to be distinguishable by the eye, but there will appear a luminous line on the fluorescent screen which will be proportional to the amplitude of the alternating wave or peak voltage of the wave, the end of this line being opposite the point on the adjacent scale denoting such peak voltage. This line may be made to appear adjacent either of the scales 30 or 31, according to the magnitude of the voltage to be measured, in a manner as already described; and also the more sensitive plates 20 and 21 or the less sensitive plates 22 and 23 may be brought into action as hereinbefore described. For example, if the voltage to be measured is an alternating current voltage of peak voltage 2400 volts the switch arms 26 and 25' will be moved into engagement with the contacts 27 and 27' and the potentiometer contact 14 is adjusted to remove all voltage from across the plates 10 and 11. There will then appear adjacent the scale 31 a line of light 34 as shown in dotted lines having its end opposite the point in the scale corresponding to 2400 volts.

It has been observed that the sensitiveness of the instrument, that is the amount of shift of the luminous spot on the fluorescent screen from a given voltage to be measured, may be varied by employing different sets of deflecting plates as the pair of plates 20 and 21 and the pair of plates 22 and 23. The sensitiveness of the instrument may also be varied by varying the potential applied to the accelerating electrode 6. This may be done by adjustment of the potentiometer contact 9'. If, for instance, it be assumed that there is 1000 volts difference of potential between the filament 2 and the accelerating electrode 6 when the luminous point shall move to the scale division 450 with 450 volts impressed on the plates 20—21, by decreasing the accelerating voltage (between the filament and the accelerating electrode 6) to 500 volts and applying 225 volts to the plates 20—21, the same location of the spot would be obtained. The movement of the luminous spot for a given voltage to be measured, and therefore the sensitiveness of the instrument, would be thus doubled, the true voltage being arrived at by dividing the scale reading by 2, and the voltage could be read with greater accuracy.

It will be understood that any number of pairs of plates 20—21, 22—23 etc., and corresponding scales (or the scale readings multiplied by suitable constants), may be employed to provide different degrees of sensitiveness of the instrument.

Figure 4:
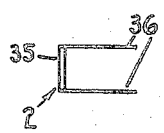
Fig. 4 is a fragmentary view showing the electron-emitting portion of the filament in side elevation.
Figure 5:
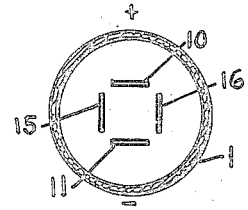
Fig. 5 is a section on the line 5—5 of Fig. 1.

The filament 2 is preferably so formed as to give an elongated spot or line rather than a round spot. This may be accomplished by making the filament, or at least the electron-emitting portion thereof, a short straight portion as shown in Fig. 4, this electron-emitting portion 35 being supported on suitable conductors 36 as shown.

It may be that the voltage applied to a device is not desired to exceed a certain maximum, such devices being for instance connected to the ends 37 of the conductors 25. To provide a means for disconnecting such devices when the voltage is too high, an electrode 38 is mounted within the envelope 1 and so placed that when the cathode beam has been deflected beyond the range of the scales 30—31, it will impinge upon the electrode and thereby complete the circuit through the solenoid 39, the battery 7 and the filament. The solenoid will then attract its armature 40 breaking the circuit to the devices to which the ends 37 are connected, at the contact 41. When the voltage shall have been lowered so that the cathode beam no longer impinges upon the electrode 38 the circuit of the solenoid 39 will be broken and the connection of the voltage source with the devices connected with the ends 37 of the leads 25, will be reestablished.

Figure 6:
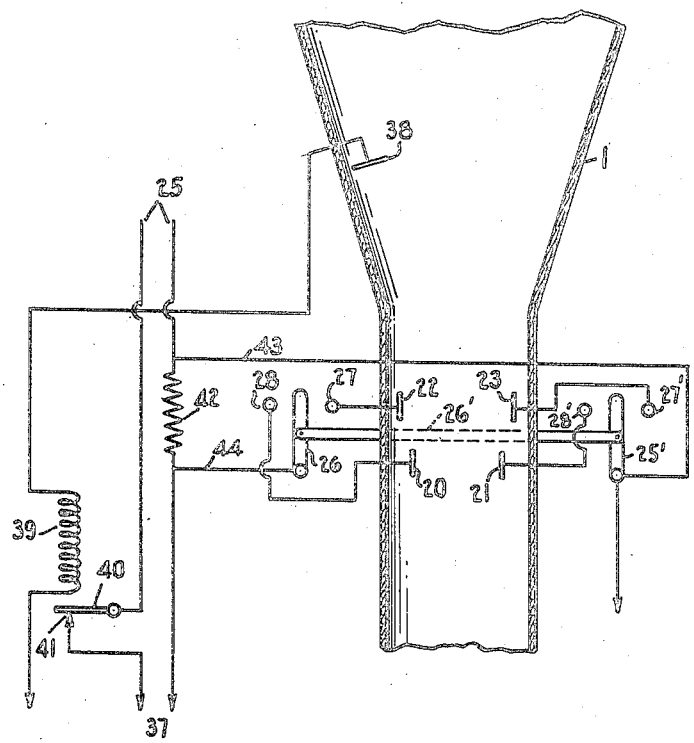

Referring to Fig. 6, the parts are in all respects the same as in Fig. 1 except that instead of having the deflecting plates connected respectively with the two conductors 25, such deflection plates are connected with the terminals of a resistance connected in series in one of the conductors 25. The drop of potential across this resistance is proportional to the current flowing through it so that the voltage impressed upon the deflection plates of the cathode tube is proportional to and therefore a measure of the current flowing in one of the conductors 25 and therefore through the devices connected to the ends 37; also the scales for observing the deflection of the light spot caused by the cathode beam, are calibrated in amperes instead of volts.

Referring more in detail to Fig. 6 the vacuous glass envelope 1 contains the cathode beam deflection plates 20 and 21 and also the cathode ray deflection plates 22 and 23 located at greater distances from the beam than are the plates 20 and 21. The plates 22 and 23 therefore produce a correspondingly reduced effect upon the cathode beam. The plates 20 and 21 are respectively connected with the switch contacts 28 and 28' while the plates 22 and 23 are respectively connected with the switch contacts 27 and 27'. The contact 28 and 27 are adapted to be alternately engaged by the pivoted conducting switch arm 26 while the contacts 27' and 28' are adapted to be alternately engaged by the pivoted conducting switch arm 25'. The arms 26 and 25' are mechanically connected together by the insulating bar 26' pivoted to the arms 26 and 25' at its ends. The switch arms 26 and 25' are therefore moved together in such manner as to simultaneously engage with the contacts 28 and 28' on the one hand and the contacts 27 and 27' on the other hand. In series in one of the supply conductors 25 is connected a resistance 42 so that the current passing through the supply conductors to the devices connected to the ends 37 of those conductors passes through such resistance. The difference of potential between the ends of the resistance 42 is a measure of the current passing through the supply conductor and therefore of the current supplied to the devices connected to the ends 37. One end of this resistance is connected by a conductor 43 with the pivoted switch arm 25' and the other end of that resistance is connected by the conductor 44 with the pivoted switch arm 26. There is therefore impressed upon the switch arms 25' and 26 a potential or voltage which is proportional to the current flowing in the supply conductors 25. When these switch arms are thrown into engagement respectively with the contacts 28 and 28' this potential or voltage is impressed upon the deflection plates 20 and 21 and the cathode beam is deflected accordingly, its deflection being read in amperes upon the scale adjacent to the fluorescent screen. If the current to be measured is large, the switch arms 26 and 25' are thrown into engagement respectively with the contacts 27 and 27' when the voltage or potential impressed upon the switch arms will be impressed upon the deflection plates 22 and 23 which are located at a greater distance from the cathode beam and thus exercise a less deflection per unit of current flowing.

The flow of excess current through the supply conductors 25 and the devices connected to the ends 37 is guarded against by means of the plate 38 within the vacuous glass envelope 1 connected through the coil 39 of a relay and a suitable source of current as in Fig. 1. If the flow of current becomes excessive so that the cathode ray is deflected so far that it engages the plate 38, a circuit for the relay coil 39 will be formed when the relay armature 40 will be attracted away from its stationary contact 41 thereby breaking the circuit through the supply conductors 25 and device connected to their ends 37.

While the invention has been illustrated in what are considered its best applications it may have other embodiments without departing from its spirit and is not therefore limited to the structures shown in the drawings.

What I claim is:

1. In a measuring device for electric quantities, the combination with a vacuous envelope provided with fluorescent material, means for producing a stream of electrons and projecting it against said material and thereby producing a luminous spot, means for deflecting said stream in response to the electrical quantity to be measured and a scale calibrated in units of said electrical quantity adjacent the path of shift of said spot whereby the amount of said shift may be observed in terms of said units.

2. In a measuring device for electric quantities, the combination with a vacuous envelope provided with fluorescent material, means for producing a stream of electrons and projecting it against said material and thereby producing a luminous spot, a plurality of means for deflecting said stream by different amounts in response to the electrical quantity to be measured and a scale calibrated in units of said electrical quantity adjacent the path of shift of said spot whereby the amount of said shift may be observed in terms of said units.

3. In a measuring device for electric quantities, the combination with a vacuous envelope provided with fluorescent material, means for producing a stream of electrons and projecting it against said material and thereby producing a luminous spot, a plurality of means for deflecting said stream in response to the electrical quantity to be measured and a scale calibrated in units of said electrical quantity adjacent the path of shift of said spot whereby the amount of said shift may be observed in terms of said units, said deflecting means being selectively operable to produce different sensitiveness of the instrument.

4. In a measuring device for electric quantities, the combination with a vacuous envelope provided with fluorescent material, means for producing a stream of electrons and projecting it against said material and thereby producing a luminous spot, means for deflecting said stream in response to the electrical quantity to be measured and a plurality of scales calibrated in units of said electrical quantity adjacent the path of shift of said spot whereby the amount of said shift may be observed in terms of said units.

5. In a measuring device for electric quantities, the combination with a vacuous envelope provided with fluorescent material, means for producing a stream of electrons and projecting it against said material and thereby producing a luminous spot, means for deflecting said stream in response to the electrical quantity to be measured and a plurality of scales calibrated in units of said electrical quantity adjacent the path of shift of said spot whereby the amount of said shift may be observed in terms of said units and means for shifting said spot from one scale to another.

6. In a measuring device for electric quantities, the combination with a vacuous envelope provided with fluorescent material, means for producing a stream of electrons and projecting it against said material and thereby producing a luminous spot, means for deflecting said stream in response to the electrical quantity to be measured and a scale calibrated in units of said electrical quantity adjacent the path of shift of said spot whereby the amount of said shift may be observed in terms of said units and means for adjusting said spot to the zero position of the scale when the quantity to be measured is zero.

7. In an electrical measuring device, the combination with a vacuous envelope provided with fluorescent material, means comprising a filament, a focusing electrode and an accelerating electrode for producing a stream of electrons and projecting it against said material and thereby producing a luminous spot, means for deflecting said stream in response to the electrical quantity to be measured, a scale calibrated in units of said electrical quantity adjacent the path of shift of said spot whereby the amount of said shift may be observed in terms of said units and means for applying a variable potential difference between said filament and said accelerating electrode whereby the shift of said spot may be varied for a given quantity to be measured.

ALLEN B. DU MONT.